W. R. WIDDUP.
REMOVABLE BUSHING.
APPLICATION FILED SEPT. 20, 1912.

1,124,986.

Patented Jan. 12, 1915.

Witnesses

W.R.Widdup,
Inventor by C.A.Snow & Co.
Attorneys

UNITED STATES PATENT OFFICE.

WILLIAM R. WIDDUP, OF SPARTANBURG, SOUTH CAROLINA.

REMOVABLE BUSHING.

1,124,986.

Specification of Letters Patent. Patented Jan. 12, 1915.

Application filed September 20, 1912. Serial No. 721,493.

*To all whom it may concern:*

Be it known that I, WILLIAM R. WIDDUP, a citizen of the United States, residing at Spartanburg, in the county of Spartanburg and State of South Carolina, have invented a new and useful Removable Bushing, of which the following is a specification.

My invention relates to a removable bushing and more particularly to a bushing adapted to be used in the roll stand of a spinning machine.

The object of the invention is to provide a bushing which will receive the transverse thrust of the shaft due to the inclination of the frame in which the shaft is mounted, the bushing being so constructed that it will coöperate with the shaft to define an oil-receiving groove.

With these and other objects in view the invention consists of the following details of construction and combination of parts as will be more clearly understood from the following specification and drawings, in which:—

Figure 1:
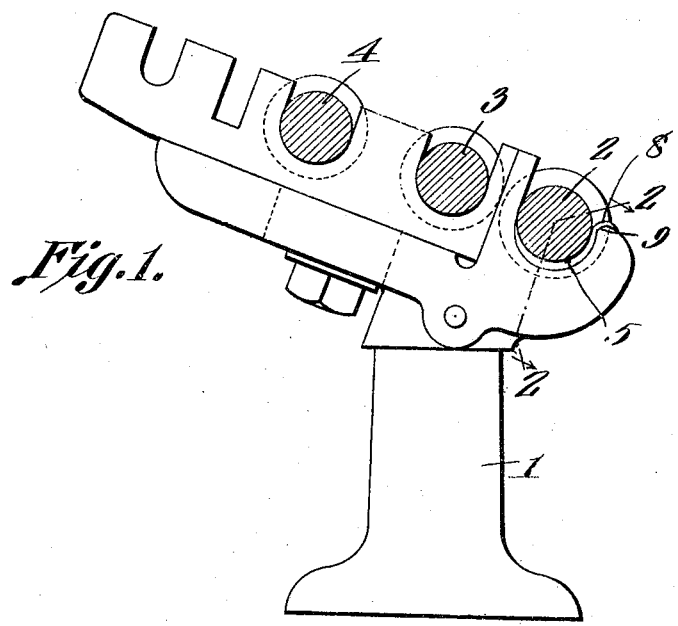
Figure 2:
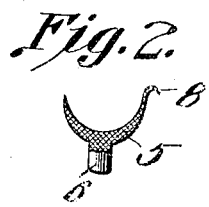
Figure 3:
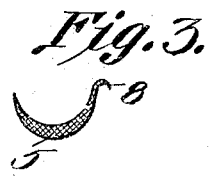

Figure 1 is a side elevation of the roll stand showing the bushing in position. Fig. 2 is a section of the bushing, a portion thereof appearing in elevation; Fig. 3 is a transverse section showing a modified form of the bushing.

In the drawings, the numeral 1 indicates the roll stand, 2 the front drawing roll, 3 the intermediate drawing roll, 4 the rear or feed drawing roll, and 5 my improved bushing. The bushing 5 is substantially semi-circular in cross section and may be of brass, bronze or Babbitt metal. The bushing is of greater thickness at the bottom than at the edges as the greater weight and wear will be on the bottom. A projection 6 is formed on the under side of the bushing and is adapted to enter a hole which, as will be clearly understood by any mechanic may be formed in the roll stand.

The bushing 5 is provided with a lip 8 which is adapted to extend over the edge 9 of the roll stand. Since the bushing is formed with the lip 8, if desired, the projection 6 may be done away with.

In roll stands, as now commonly made, considerable difficulty has been experienced from the fact that the rolls wear and when they become worn have to be removed and new ones put into place, or taken to a shop for repair. By providing the improved bushing which is of softer metal than the roll, the roll will not so readily wear and when the bushing is worn it can be removed and a new one put in place.

Noting the drawings, it will be observed that the bushing comprises walls of unequal height, the higher wall being so disposed as to receive the transverse thrust of the shaft, and the curved lip 8 coöperating with the periphery of the shaft to define an oil-receiving groove.

Having fully described my invention, what I claim and desire to secure by Letters Patent is:—

In a device of the class described, a frame having a journaling notch in its upper edge, the frame being inclined with respect to the horizontal thereby to incline the notch with respect to the vertical; a trough-shaped bushing in the notch; and a shaft journaled in the bushing; the bushing comprising walls of unequal height, the higher wall being disposed toward the lower end of the frame and having its upper edge disposed substantially in a horizontal plane passing through the center of the shaft, thereby to receive the transverse thrust of the shaft due to the inclination of the frame, the upper edge of the higher wall of the bushing having a lip curved in a direction opposite to the periphery of the shaft, the lip overhanging and engaging the frame to prevent a rotation of the bushing, and the lip coöperating with the periphery of the shaft to define an oil-receiving groove between the lip and the periphery of the shaft.

In testimony that I claim the foregoing as my own, I have hereto affixed my signature in the presence of two witnesses.

WILLIAM R. WIDDUP.

Witnesses:
C. R. SMITH,
A. H. DREYER, Jr.

Copies of this patent may be obtained for five cents each, by addressing the "Commissioner of Patents, Washington, D. C."